United States Patent [19]
Hansen et al.

[11] Patent Number: 5,272,700
[45] Date of Patent: * Dec. 21, 1993

[54] SPECTRALLY EFFICIENT BROADBAND TRANSMISSION SYSTEM

[75] Inventors: David E. Hansen, Sunnyvale; Robert P. McNamara, San Jose; James C. Long; Michael J. Serrone, both of Sunnyvale; Chinh Q. Phan, Fremont; Long K. Tran, Milpitas, all of Calif.

[73] Assignee: First Pacific Networks, Inc., Sunnyvale, Calif.

[*] Notice: The portion of the term of this patent subsequent to Jan. 28, 2009 has been disclaimed.

[21] Appl. No.: 778,031

[22] Filed: Oct. 17, 1991

Related U.S. Application Data

[63] Continuation-in-part of Ser. No. 631,760, Dec. 21, 1990, Pat. No. 5,084,903, which is a continuation of Ser. No. 317,213, Feb. 28, 1989, abandoned.

[51] Int. Cl.$^5$ .............................................. H04J 3/02
[52] U.S. Cl. .................. 370/85.3; 370/69.1; 370/120; 370/124
[58] Field of Search ............... 370/124, 85.3, 85.12, 370/120, 69.1

[56] References Cited

U.S. PATENT DOCUMENTS

| | | | |
|---|---|---|---|
| Re. 32,327 | 1/1987 | Biba et al. | 370/124 |
| 4,498,169 | 2/1985 | Rozmus | 370/85.9 |
| 4,751,701 | 6/1988 | Roos et al. | 370/85 |
| 5,084,903 | 1/1992 | McNamara et al. | 370/69.1 X |
| 5,088,111 | 2/1992 | McNamara et al. | 375/18 |

FOREIGN PATENT DOCUMENTS

| | | |
|---|---|---|
| 0360476 | 3/1990 | European Pat. Off. . |
| 0385695 | 9/1990 | European Pat. Off. . |
| 89/05076 | 6/1989 | PCT Int'l Appl. . |

Primary Examiner—Douglas W. Olms
Assistant Examiner—Russell W. Blum
Attorney, Agent, or Firm—Townsend and Townsend Khourie and Crew

[57] ABSTRACT

A baseband signal is spectrally efficiently transmitted on a broadband transmission medium by inserting gaps in packets of digital data transmitted in a modulated first radio frequency carrier. The transmitted packets of data are received by demodulating the modulated first radio frequency carrier, and the gap is monitored for the presence of digital data thus indicating a collision of simultaneously transmitted packets of digital data. A seed of arbitrary digital bits are used in scrambling each packet of digital data and is transmitted with the packet of data for use in descrambling the data. In retransmitting the packet of data the seed is included. The originally transmitting node receives the retransmitted packet and compares the retransmitted seed with the originally transmitted seed for detecting an error in retransmission.

21 Claims, 9 Drawing Sheets

DTE TO COAXIAL CABLE

COAXIAL CABLE TO DTE (NO COLLISION)

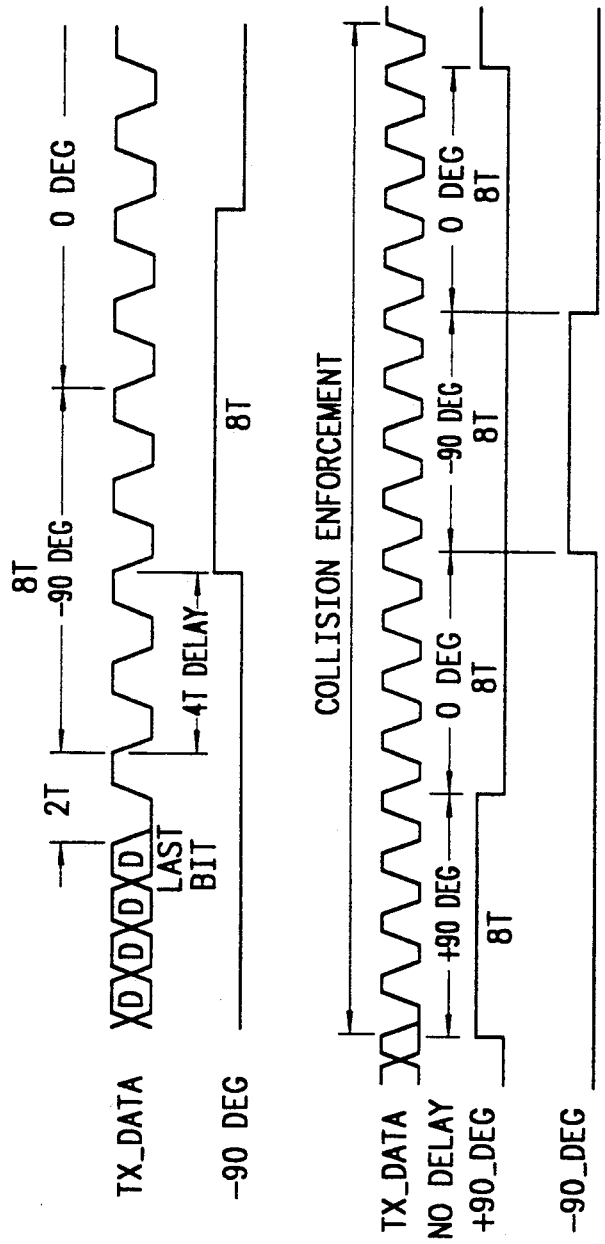
FIG. 7A
FIG. 7B
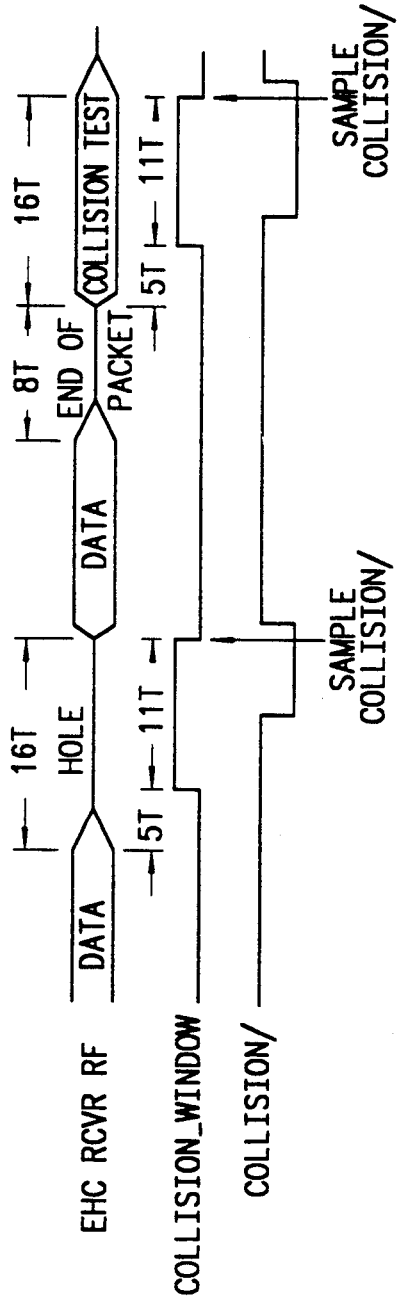
FIG. 7C

EHC COLLISION ENFORCEMENT TIMMING DIAGRAM

COLLISION TIMING DIAGRAM (EMC BIT BY BIT COMPARE)

SPECTRALLY EFFICIENT BROADBAND TRANSMISSION SYSTEM

This application is a continuation-in-part of application Ser. No. 07/631,760, filed Dec. 21, 1990 for "MODULATION AND DEMODULATION SYSTEM EMPLOYING AM-PSK AND QPSK COMMUNICATION SYSTEM USING DIGITAL SIGNALS", now U.S. Pat. No. 5,084,903, issued Jan. 28, 1992, a continuation of application Ser. No. 07/317,213, filed Feb. 28, 1989, abandoned.

BACKGROUND OF THE INVENTION

This invention relates generally to broadband communication systems, and more particularly the invention relates to a spectrally efficient broadband communications system using a media attachment unit, or modem, which emulates an attachment unit interface used on a baseband medium. In a particular application, the invention provides a carrier sense multiple access network with collision detection (CSMA/CD) meeting the IEEE 802.3 10Broad36 specification using 12 MHz transmission channels.

The most common type of local area network for transmitting data between computers is CSMA/CD, supra. This type of network is specified by Ethernet and IEEE 802.3, "CSMA/CD Access Method and Physical Layer Specifications". The network consists of a number of nodes (computers) connected to a common bus. Each node has a unique address and can transmit packets of data to any other node on the bus. A requirement of this type of network is that all nodes have equal access to the network. This is accomplished by collision detection and enforcement. If two nodes attempt to transmit at the same time, one or both will detect a collision and transmit an alarm. All nodes will cease transmission and delay retransmission for a random period of time.

The transmission medium for Ethernet and IEEE 802.3 10Base5 and 10Base2 is a coaxial cable onto which Manchester encoded baseband data is transmitted. Unfortunately this medium provides a very limited diameter (maximum distance between two remote nodes) due to attenuation from the cable. The maximum specified diameter for a baseband network is 500 meters. In addition, baseband transmission is not spectrally efficient, with the entire bandwidth of the cable occupied by one signal.

IEEE 802.3 10Broad36 was an attempt to address the deficiencies of baseband transmission by modulating the signal onto a broadband medium. The diameter was expanded to 3750 meters, and the entire signal was limited to two 18 MHz bands, one upstream, one downstream, so that the cable could be used for other applications. The 18 MHz bandwidth included the modulated 10 Mbit/s data, as well as bandwidth reserved for out of band signalling for collision enforcement. Unfortunately, implementation of 10Broad36 is very expensive, requiring special circuitry for generating and detecting the out of band collision enforcement signal, and requiring a total of 36 MHz of bandwidth for signal and collision enforcement.

The present invention provides a spectrally efficient and inexpensive means of transmitting data over a broadband network. The use of "holes" and phase modulation of the data for collision detection and signalling, eliminates the need for out of band signalling, reducing the expense of the hardware, and moving collision detection to the headend. This nearly doubles the maximum network diameter for full collision enforcement.

SUMMARY OF THE INVENTION

Accordingly, an object of the invention is an improved apparatus and method for modulating a baseband CSMA/CD data network onto a broadband communications medium.

Another object of the invention is a spectrally efficient broadband communication system and method.

Still another object of the invention is an improved method of collision detection in a multiple access broadband communication system.

Another object of the invention is an improved method of signalling collision detection.

Briefly, the invention provides a spectrally efficient means for extending the distance over which a baseband CSMA/CD network, for example, can operate by modulating and demodulating the baseband data onto and off of a broadband network in a way that is transparent to the baseband circuitry, protocols, and controlling software. The broadband network comprises a plurality of remote nodes connected to a headend unit through a bidirectional bus. The nodes transmit packets in a burst mode upstream to the headend unit and receive a continuous transmission downstream from the headend unit which consists of an idle or "pseudosilence" signal in the absence of transmitted packets. Contention between nodes attempting to access the bus simultaneously is resolved as specified by the baseband network.

Collision detection is implemented on the broadband network by inserting a "hole" or gap in transmission into upstream packets at a predetermined location. The headend unit demodulates the packets, identifies the location of the hole and detects the energy in the channel which will be clear during the hole in the absence of a collision. If a collision is detected, the downstream signal is replaced by a collision alarm which can comprise the pseudosilence with the phase of the baseband data modulated in a particular pattern which then can be detected at the remote nodes. Additional collision detection is provided by each transmitting node monitoring the downstream retransmission of its packets for errors. If an error is detected, the transmission is replaced with a random data sequence to insure that its transmission is detected by the headend during the hole of the competing packet.

In a preferred embodiment, the modulation method for the upstream channel is Differentially Encoded Offset QPSK. Downstream modulation is Class 1, Partial Response AM-PSK. The end of packet for the downstream data is indicated by modulating the phase of the transmitted data in a pattern different from the collision alarm.

The invention and objects and features thereof will be more readily apparent from the following description and appended claims when taken with the drawings.

BRIEF DESCRIPTION OF THE DRAWINGS

FIG. 7A is a timing diagram for the headend generated end of packet.

FIG. 7B is a timing diagram for collision enforcement.

FIG. 7C is a timing diagram for collision integrate and dump circuit of the headend.

DETAILED DESCRIPTION OF THE ILLUSTRATIVE EMBODIMENTS

Figure 1:
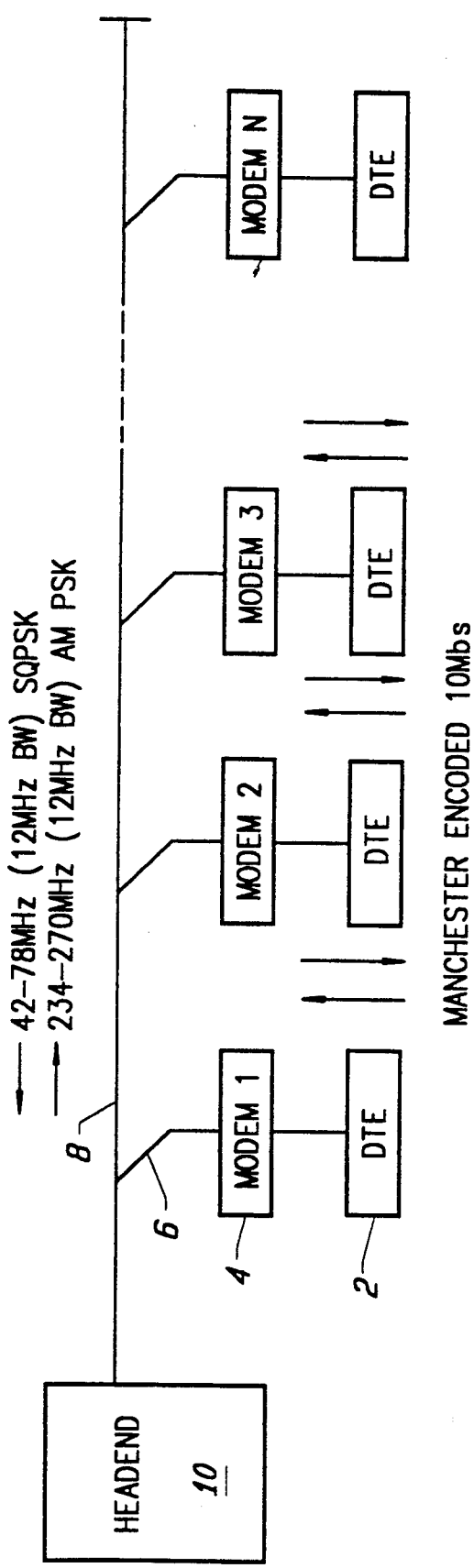
FIG. 1 is a schematic diagram of a transmission system in accordance with the invention.

Referring now to the drawings, FIG. 1 is a schematic diagram of a CSMA/CD transmission system in accordance with one embodiment of the invention. A plurality of data terminal equipment (DTE) or computers 2 are interconnected through modems 4 and directional couplers 6 to a bidirectional transmission line 8. Data is transmitted by the modems upstream to a headend unit 10 which receives and demodulates the upstream transmissions and retransmits the data downstream to an addressed DTE.

As noted above, the IEEE 802.3 10Broad36 specification provides for broadband transmission of signals by modulation onto a broadband medium with the diameter, or maximum distance between two remote nodes, being 3750 meters. According to the specification, the entire signal is limited to two 18 MHz bands, one upstream and one downstream, so that the cable can be used for other applications. The 18 MHz bandwidth includes the modulated 10 MBS data as well as bandwidth reserved for out-of-band signaling for collision enforcement.

The present invention provides a spectrally more efficient and inexpensive means of transmitting data over a broadband network in accordance with the above IEEE specification. The use of a "hole" and phase modulation of the data for collision eliminates the need for out-of-band signaling, thus reducing the expense of the hardware and reducing the transmission channels from 18 MHz to 12 MHz bands.

The modem is the primary interface between a DTE and the broadband cable system. The modem transmits data from the connected DTE, receives transmitted data addressed to the DTE, provides collision enforcement and jabber functions. The headend unit is responsible for providing a frequency translation between the upstream and downstream RF channels, providing a synchronous 10 MHz system clock to all of the modems, data packet reformatting, and collision detection.

More particularly, each modem receives 10 Mbs Manchester encoded signals from a DTE and transforms the signal at the coaxial cable interface by delaying and reformatting these signals. The received Manchester encoded data is decoded to produce NRZ data and a recovered clock signal. The NRZ data is transmitted through buffering means for synchronization to the broadband network 10 MHz clock and to allow a 16 bit "hole" to be inserted into the transmitted data for collision detection. A data packet is constructed at the output of the buffer including an unscrambled preamble followed by the scrambled data packet with a seed for the scrambler chain included on each transmitted packet. During the scrambled portion of the data packet, the scrambler will be paused and the carrier dropped for an interval to generate a "hole" in the transmitted data. The "hole" or gap is used for the upstream collision detection. In the described embodiment, the packet is encoded by QPSK and transmitted in a 12 MHz channel in one of five channels between 42-78 MHz. The channel step size is 6 MHz to allow more versatility in positioning the 12 MHz channel.

The headend unit provides frequency translation from an upstream frequency to a downstream frequency, data reclocking and synchronization, clock generation, and collision enforcement. The QPSK modulated RF signal at the upstream frequency is received from the broadband coaxial medium, and the presence of an RF signal is detected. When no signal is received by the headend unit, a pseudosilence (e.g., a series of 101010 ... 10) is transmitted. Upon detection of the presence of the RF signal, the pseudosilence transmission is stopped. The incoming RF data signal is demodulated and decoded to provide a received bit stream. The decoded data bits are then descrambled. The headend unit monitors the collision window and detects the presence of a carrier signal during the collision window as an indication that a collision has occurred (i.e. more than one modem is transmitting data). In the absence of a collision, the decoded data is retransmitted downstream in a 12 MHz channel between 234-270 MHz along with the address for the destination DTE. A collision is signalled by phase shifting the retransmitted data with the modems detecting the phase shift as an indication of collision whereupon the modems must delay for a period of time before retransmitting data.

Each modem receives the modulated RF signal transmitted by the headend unit on the broadband coaxial medium and demodulation decodes the incoming RF data signal to provide a received bit stream. The presence of information is distinguished by the lack of pseudosilence signal transmitted by the headend unit. The decoded packets of retransmitted data are then descrambled using the transmitted seed and then Manchester encoded and sent to the DTE.

The modem which transmitted the data to the headend unit also monitors the retransmitted data and compares the received seed with the transmitted seed. If there is a discrepancy between the transmitted and received seed bits, the transmitting modem enters a local collision detection state and commences transmission of collision enforcement until the collision signal from the headend unit is received or pseudosilence is detected.

Figure 2A:
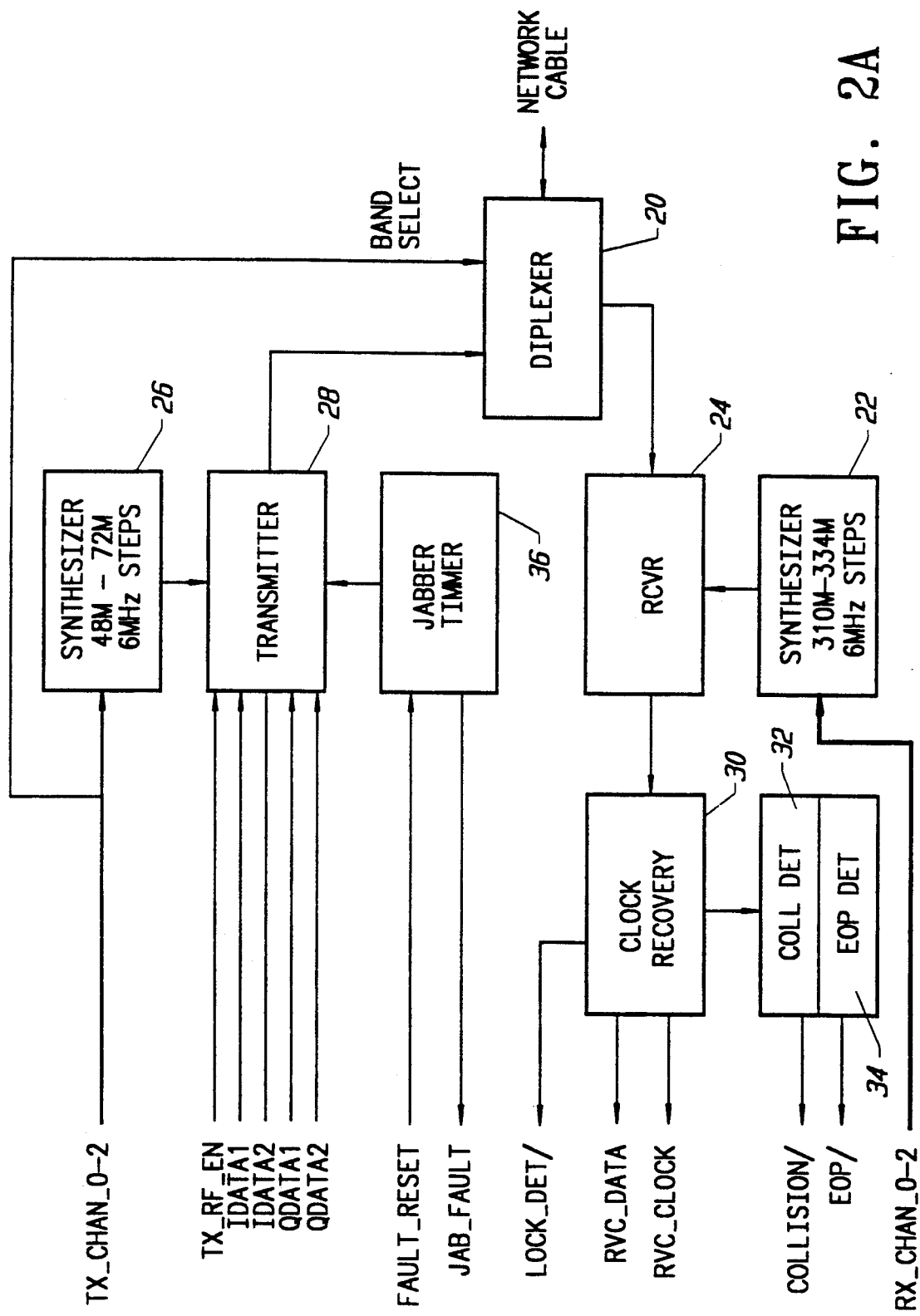
FIGS. 2A and 2B are functional block diagrams of a modem in accordance with one embodiment of the invention.
Figure 2B:
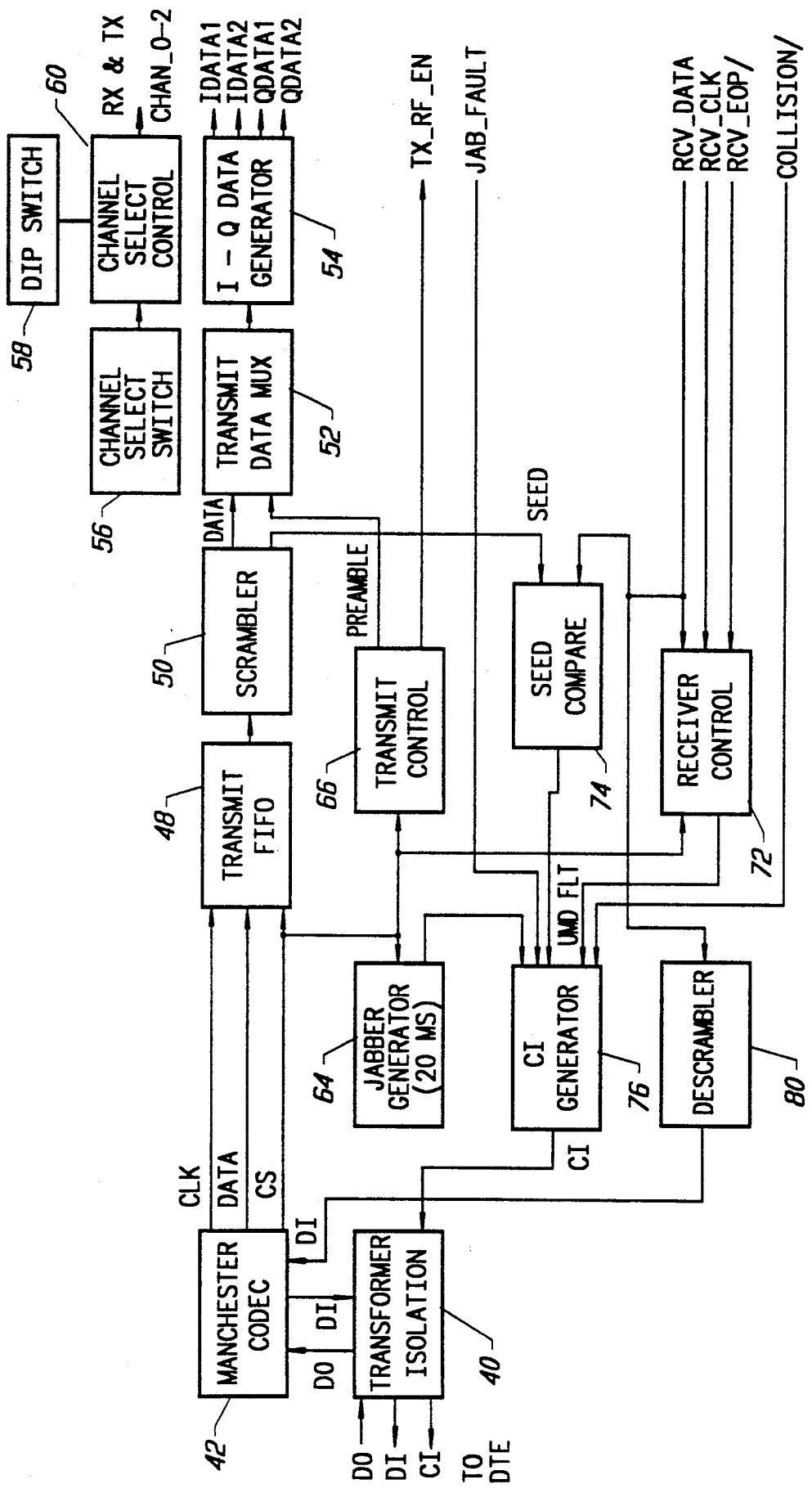

FIGS. 2A and 2B are functional block diagrams of a modem in accordance with one embodiment of the invention, FIG. 2A being the RF portion of the modem which interfaces with the cable network and FIG. 2B being the hardware subsystem (HWS) which interfaces with the DTE.

The modem RF subsystem provides the circuitry to 1) convert the data packets generated by the HWS into a modulated RF signal suitable for transmission in a 12 MHz channel on a coaxial cable, 2) receive a modulated signal from the coaxial cable and provide binary data to the HWS, and 3) detect collision signals that occur on the network.

The diplex filter assembly 20 consists of a bandpass filter for the receiver, and a lowpass filter for the transmitter with switchable frequency response determined by the TX CHAN lines from the channel select switch.

The receive synthesizer 22 generates one of five local oscillator (LO) frequencies for the receiver down conversion, as determined by the RX CHAN lines from the channel select switch.

The receiver 24 provides 1) downconversion of the selected RF signal, 2) filtering to reject adjacent channels, 3) automatic gain control, and 4) AM detection of the AMPSK signal and baseband filtering.

The transmit synthesizer 26 generates one of five local oscillator (LO) frequencies for the transmit modulator, as determined by the TX_CHAN lines from the channel select switch.

The transmitter 28 provides 1) baseband filtering of two differentially encoded binary data signals from the HWS, 2) QPSK modulation and transmission of selected carrier frequency, and 3) gating of transmit signals as determined by the TX_RF_ENABLE line from the HWS.

The clock recovery circuit 30 uses a PLL to extract the data clock from the data stream. The data stream consists of data or pseudosilence so there is always a constant signal for the clock recovery PLL.

The collision detector 32 monitors the downstream signal to determine if a collision enforcement signal is being sent by the headend unit. The detector monitors the phase of the received data stream by monitoring the output of the phase detector in the clock recovery PLL. When the headend unit sends a collision enforcement signal, the phase of the data shifts by +90° and the detector will make COLLISION/ true for as long as the collision signal is present. Since the collision signal can last for a relatively long time, the collision phase shift signal must alternate between +90° and −90° after the initial +90° phase shift.

The end of packet (EOP) detector 32 monitors the downstream signal to determine if a EOP flag has been sent by the headend. The EOP flag indicates that the packet has ended and the 8 bit data boundary is used to find the exact end of packet. The EOP flag is sent the same way as the collision enforcement signal except that the phase shift is −90°.

The Jabber timer 36 is an independent fail-safe circuit that monitors RX_RF_ENABLE line and disables the transmitter if continuous transmission exceeds 150 msec. It provides a fault indication to the hardware subsystem (HWS) if a time out occurs. The delay is much longer than the maximum packet length (1.25 msec.) to allow the HWS time to try and shut down the DTE.

The modem hardware subsystem (HWS) provides the circuitry to 1) convert the Manchester coded data from the DTE into NRZ data, 2) assemble a data packet that will be transmitted by the RF subsystem, 3) process data packets that are received by the RF subsystem and convert them to Manchester coded data, and 4) implement the collision enforcement protocol.

Referring to FIG. 2B, transformer isolation 40 provides the interface between the HWS and the DTE through data out (DO) line, data in (DI) line, and collision line (CI). On the receiver side of the modem, the Manchester codec receives the NRZ data output from the HWS and converts it to a Manchester coded data to be transmitted to the DTE on the DI circuit.

On the transmitter side of the modem, the Manchester codec receives the Manchester coded data on circuit DO from the DTE and converts it to NRZ data and synchronized clock. The data and clock signal are then applied to a FIFO buffer 48 which provides buffering between the broadband network 10 MHz clock and the input data stream clock. Buffer 48 also allows a 16 bit "hole" to be inserted into the incoming data for collision detection in the transmitted signal.

The data from FIFO 48 is then applied to a scrambler 50 which scrambles the data in accordance with an arbitrary bit sequence or seed. A 22 bit preamble consisting of 20 bits of unscrambled alternating 0-1 pattern and an unscrambled mode delimiter (UMD) which is used as a start-of-data flag and consists of a 2 bit 0-0 pattern and followed by the scrambled data packet. The scrambler utilizes a 23 bit seed which is transmitted after the UMD and replaces 23 bits of the preamble. These 23 bits are stored in a latch and later compared with the seed on the receive data.

The packet of data from scrambler 50 is then applied to a transmit data mux 52 and I-Q data generator 54 to provide four data signals to the transmitter 28 of FIG. 2A.

Channel select switch 56 and DIP switch 68 control a channel select controller 60 which selects the receive and transmit channels.

Signals from the receiver (data, clock, and end of packet) in FIG. 2A are applied to receiver control. A UMD FLT signal (UMD fault is active if UMD length is longer than expected) from the receiver control 72 along with a collision signal, jabber fault signal (active if data from DTE exceeds 20 ms), and a seed compare fault signal from 74 are applied to a collision (CI) generator 76. The CI signal is then applied to the transformer isolation 40 on the CI line to the DTE.

Data is also applied through the descrambler 80 and then to the Manchester codec 42.

The Manchester carrier sense CS signal from Manchester codec is applied also to jabber generator 64 and to transmit control 66 with the transmit control 66 providing a preamble for the transmitted data and the RF transmitter enable signal.

Figure 3A:
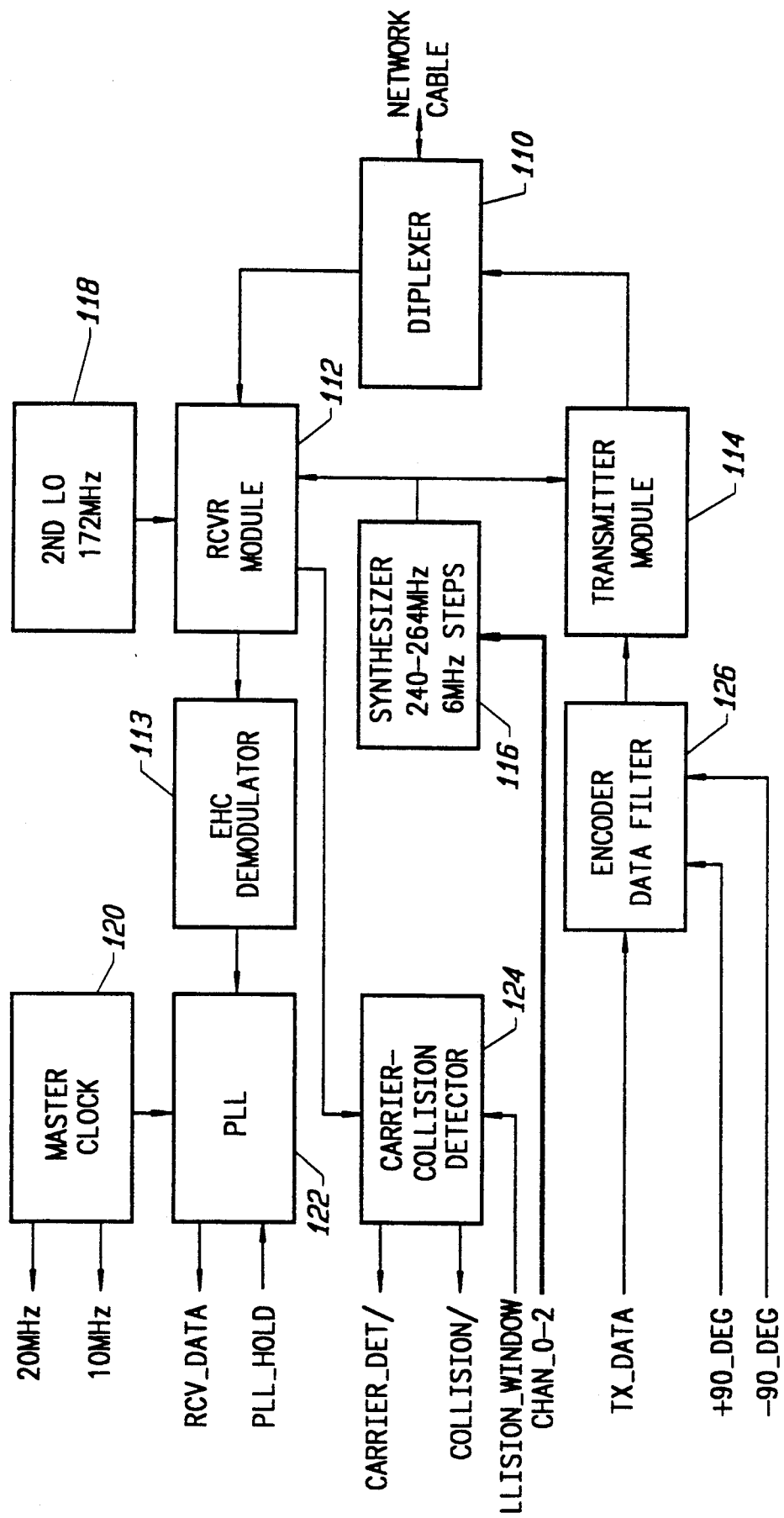
FIGS. 3A and 3B are functional block diagrams of a headend in accordance with one embodiment of the invention.
Figure 3B:
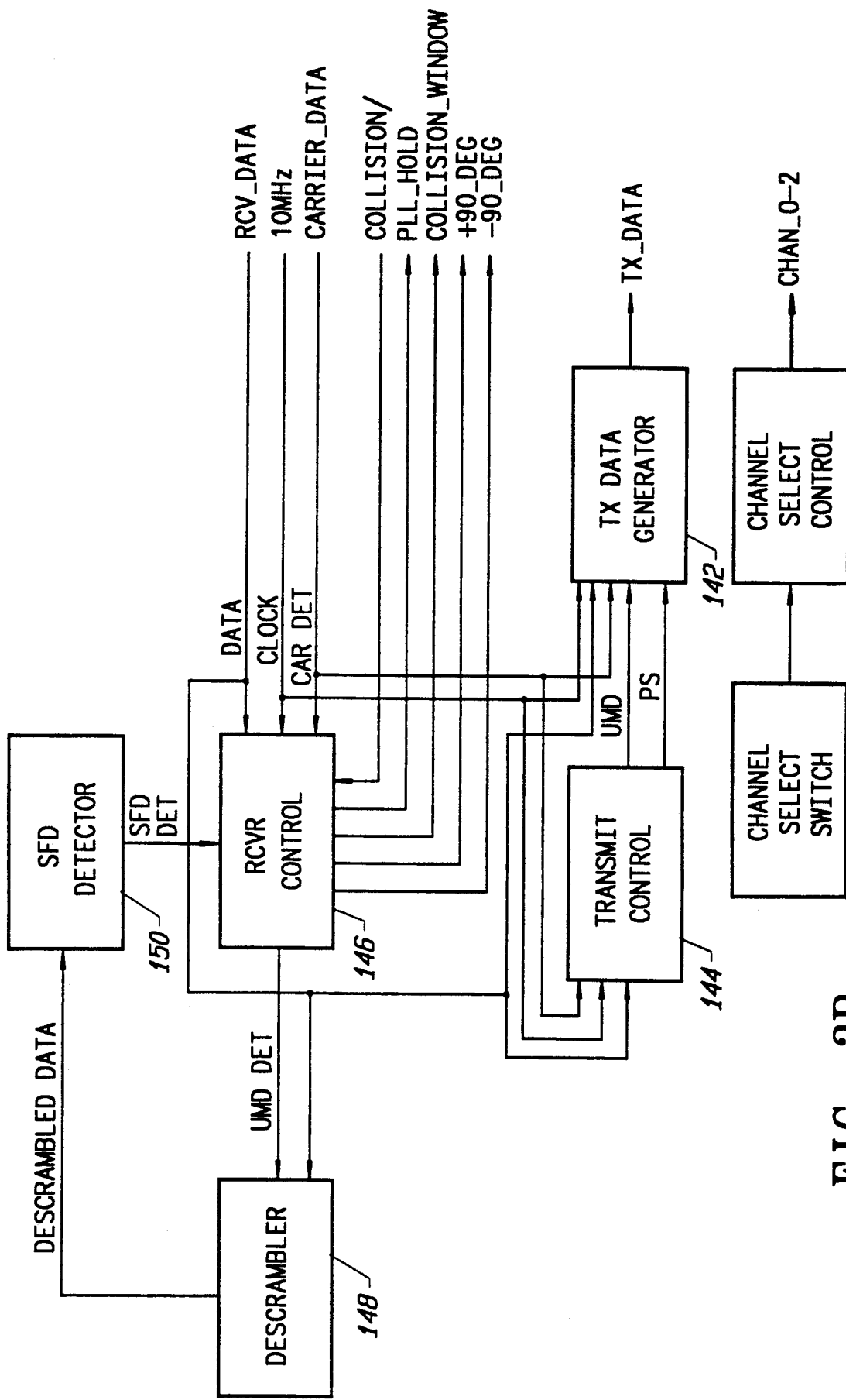

The headend unit in accordance with one embodiment of the invention is illustrated in the functional block diagrams of FIGS. 3A and 3B. FIG. 3A is a functional block diagram of the headend RF subsystem which provides the interface between the broadband transmission media and the hardware subsystem of the headend unit shown in a functional block diagram of FIG. 3B. The RF subsystem has the circuitry to 1) receive and demodulate the upstream RF signal, 2) recover the clock from the upstream signal to sample the data and then reclock the data by the headend master clock, 3) AMPSK modulate the data and transmit it downstream, 4) provide five transmit and receive frequencies, and 5) detect and enforce collisions that occur on the network.

The diplex filter assembly 110 consists of a bandpass filter for the receiver, and a lowpass filter for the transmitter. The receiver 112 and demodulator 113 provide 1) downconversion of the selected RF signal, 2) filtering to reject adjacent channels, 3) limiting of the IF signal, 4) demodulation of the QPSK signal and baseband filtering, and 5) carrier detection.

The modulator/transmitter 114 provides 1) AMPSK modulation of the filtered differentially encoded binary data signals from the HWS, and 2) transmission of the modulated signal at a selected carrier frequency.

The synthesizer 116 generates one of five frequencies which are determined by the CHAN_0-2 lines from the hardware subsystem. The five frequencies are 6 MHz apart, since the channel bandwidth is 12 MHz there are five possible center frequencies with a maximum of three channels. The signal from this synthesizer is used for the first conversion LO in the receiver and for the transmit RF signal.

A fixed crystal oscillator 118 generates the 172.00 MHz signal which is used for the second conversion local oscillator in the receiver.

A 10 MHz master clock 120 provides clocks for the headend unit and indirectly to all of the modems that are connected to the RF subsystem. Each modem derives its clock from the continuous downstream signal from the headend locking all of the clocks in the system together. The 10 MHz master clock is derived from a 80 MHz clock oscillator to provide an 8 phase 10 MHz clock and a 20 MHz clock.

The reclocking circuitry time aligns all data passing through the headend. Since all of the upstream transmissions have the same clock frequency, only the correct phase of the clock must be determined. A high speed PLL 122 is used to determine, during the 20 bits of RF preamble in the signal, the correct clock phase of the master clock to use for sampling the upstream transmission. The data is then reclocked by a constant phase of the master clock to provide a constant clock and data to the digital circuitry.

The carrier collision detector 124 monitors the upstream channel to determine if there is an RF signal present. When a strong enough signal is present, the carrier detect signal will go rue. The carrier detect signal is a fast acting signal that will rapidly detect the presence or the lack of a RF signal. The carrier detect signal is used to identify the beginning of a packet, to detect energy in the "hole", and to identify the end of the packet.

The carrier collision detector 124 also monitors the upstream channel to determine if there is an RF signal present during the "hole" that is in every non-collision packet transmitted. The collision detector integrates the carrier detect signal over the "hole" interval and samples the output at the end of the hole. The carrier detect signal needs to be integrated over a number of bits to insure that a signal is detected when there are multiple interfering transmitters that may generate a beat frequency that puts a null in the signal.

The encoder and data filter 126 provides digital and analog filtering to the encoded binary data signals from the HWS to shape the transmitted data spectrum to stay within the 12 MHz channel. The encoder also provides another downstream channel for EOP and collision enforcement without adding additional bandwidth. The encoder can shift the phase of the transmitted data stream by +90° or −90°. This phase shift signal can be picked up in the EMC's clock recovery circuit. The data that is transmitted during the phase modulation is "101010" which is pseudosilence. The EOP signal modulates the data by −90° for 8 bits and then back to 0°. The collision enforcement signal modulates the data by +90° for 8 bits, back to 0° for 8 bits, then −90° for 8 bits, and back to 0° for 8 bits. This sequence is repeated for as long as collision enforcement is needed.

The hardware subsystem shown in FIG. 3B provides the circuitry to 1) convert the upstream data packet into a downstream data packet, 2) transmit pseudosilence when no packets are being sent downstream, and 3) determine if a collision has occurred and activate the collision enforcement signal.

The data, a 10 MHz clock, and a carrier detect signal are applied to a transmission data generator 142 and transmit control 144 which generates the downstream data packet. The transmit control 144 searches for the UMD in the received data and when found, generates the transmit UMD sequence. The transmit control also generates the pseudosilence (PS) signal. Both signals are sent to the TX data generator 142 where they are multiplexed with the received data to generate the TX_DATA signal.

The data, clock, and carrier detect signals are applied also to the receiver control unit 146 which generates the collision window, phase modulation, and PLL hold signals for the RF subsection of FIG. 3A. The collision window signal indicates where to sample the hole in the data to check for collision signals. The phase modulation signals (+90_DEG and −90_DEG) indicate the following conditions: a) Collision is detected if the collision signal from the carrier-collision detector 124 is active during the collision window; b) End of packet is detected; and c) Collision test is detected at the end of the packet. The PLL_HOLD signal is active at the end of the receive data preamble and held active through the entire packet. The PLL_HOLD signal is used to hold the clock recovery phase. The data and UMD detect signals are applied through a descrambler 148 with the descrambled data applied through SFD detector 150 back to the receiver control 146.

A description of signals in the communication system will now be given. The following signals are present in the modem unit:

I_DATA 1 and Q_DATA 1 are 5.0 Mbs staggered NRZ data streams which are modulated as the In-phase and Quadrature channels by the QPSK modulator in the modem transmitter. They are derived by demultiplexing and differentially encoding the 10.0 Mbs TX_DATA generated in the HWS.

I_DATA 2 and Q_DATA 2 are identical to I_DATA 1 and Q_DATA 1 when the transmitter is enabled. When the transmitter is disabled I_DATA 1 and Q_DATA 1 go to a steady logic 1 state, and I_DATA 2 and Q_DATA 2 go to a steady logic 0 state. The timing relationship of these signals is described hereinbelow.

RCV_DATA is the 10.0 Mbs data from the modem receiver that has been reclocked by the clock recovery circuit. The data changes on the rising edge of the 0-phase clock.

RCV_CLOCK are the clocks available from the clock recovery circuit. They are 20 MHz and four phase 10 MHz.

RX_CHAN_0-2 control the receive synthesizer frequency which determines the center frequency of the selected downstream channel. The coding for these lines is:

| CHANNEL | RX_CHAN_ 2 | 1 | 0 | RCV FREQUENCY |
|---|---|---|---|---|
| 0 | 0 | 0 | 0 | 240 MHz |
| 1 | 0 | 0 | 1 | 246 MHz |
| 2 | 0 | 1 | 0 | 252 MHz |

-continued

| CHANNEL | RX_CHAN_ 2 | 1 | 0 | RCV FREQUENCY |
|---|---|---|---|---|
| 3 | 0 | 1 | 1 | 258 MHz |
| 4 | 1 | 0 | 0 | 264 MHz |

TX_CHAN_0-2 control the transmit synthesizer frequency which determines the center frequency of the transmitted carrier frequency. The coding for these lines is:

| CHANNEL | TX_CHAN_ 2 | 1 | 0 | TX FREQUENCY |
|---|---|---|---|---|
| 0 | 0 | 0 | 0 | 48 MHz |
| 1 | 0 | 0 | 1 | 54 MHz |
| 2 | 0 | 1 | 0 | 60 MHz |
| 3 | 0 | 1 | 1 | 66 MHz |
| 4 | 1 | 0 | 0 | 72 MHz |

TX_RF_ENABLE control the PIN switch at the output of the transmitter which enables the transmitter output during packet transmissions.

FAULT error flag from the jabber timer. Indicates that continuous transmission has exceeded 150 msec and transmitter output has been disabled. Designed to prevent a malfunctioning EIU from bringing down an entire channel.

FAULT_RESET is used to reset the FAULT error flag and enable the EMC transmitter output for a transmit retry. Reset only when power is cycled.

COLLISION is the collision signal that indicates that a collision enforcement signal has been received from the EHC. The signal will persist as long as the collision signal is present.

EOP is a flag that occurs at the end of a packet. The flag is used to identify the end of a packet.

LOCK DETECT is a signal from the clock recovery circuit that indicates when the clock is locked on to an incoming signal. A packet must not be transmitted unless Lock Detect is true.

The hardware subsystem to DTE interface is the interface between the computer and the modem. The connection is via the 15 pin AUI cable.

Circuit Do-Data Out is a Manchester encoded 10 Mbs data stream sourced by the DTE over a differential pair.

Circuit DI-Data In is a Manchester encoded 10 Mbs data stream sourced by the EMC over a differential pair.

Circuit CI-Control In is a control signal that is sourced by the modem over a differential pair. The control signal can send 3 types of messages to the DTE: CS0, CS1, and IDL. CS0 indicates a signal quality error (collision) and is encoded as a 10 MHz signal. CS1 (which is not used) indicates that the EMC is not available and is encoded as a 5 MHz signal. IDL indicates that the EMC is available and is encoded as no signal.

RF IN/OUT is the primary interface between the headend unit and the coaxial cable. The signal contains all outputs from the headend and all upstream traffic available on the cable.

The following signals are part of the headend unit:

TX_DATA is the 10.0 Mbs NRZ data stream to be transmitted downstream. The data is modulated as a 3-level Partial Response AM/PSK signal.

+90_DEG causes the data phase to be shifted by +90° for as long as this bit is true.

−90_DEG causes the data phase to be shifted by −90° for as long as this bit is true.

COLLISION_I/D controls the integrate and dump circuit for the collision detector. This signal goes high during the "hole" to integrate the carrier detect signal and goes low at the end of the "hole" to dump the integrator.

CHAN_0-2 controls the synthesizer frequency which determines the center frequency of the selected upstream and downstream channel. The coding for these lines is:

| CHANNEL | CHAN_ 2 | 1 | 0 | RCV FREQUENCY | TX FREQUENCY |
|---|---|---|---|---|---|
| 0 | 0 | 0 | 0 | 48 MHz | 240 MHz |
| 1 | 0 | 0 | 1 | 54 MHz | 246 MHz |
| 2 | 0 | 1 | 0 | 60 MHz | 252 MHz |
| 3 | 0 | 1 | 1 | 66 MHz | 258 MHz |
| 4 | 1 | 0 | 0 | 72 MHz | 264 MHz |

RCV_DATA out of the EHC receiver is NRZ data that has been sliced by the variable phase clock and reclocked by a constant 10 MHz clock.

CARRIER_DET/ indicates the presence of an RF signal on the upstream channel. This signal has a fast attach and release time.

COLLISION/ indicates that an RF signal was present on the upstream channel during the collision integration period. This signal should be latched when the COLLISION_I/D signal goes low.

10 MHz clocks are eight phases of the master 80 MHz clock.

20 MHz clock is a 20 MHz clock derived from the master 80 MHz clock and has a constant phase relationship to the 10 MHz clock.

Figure 4A:
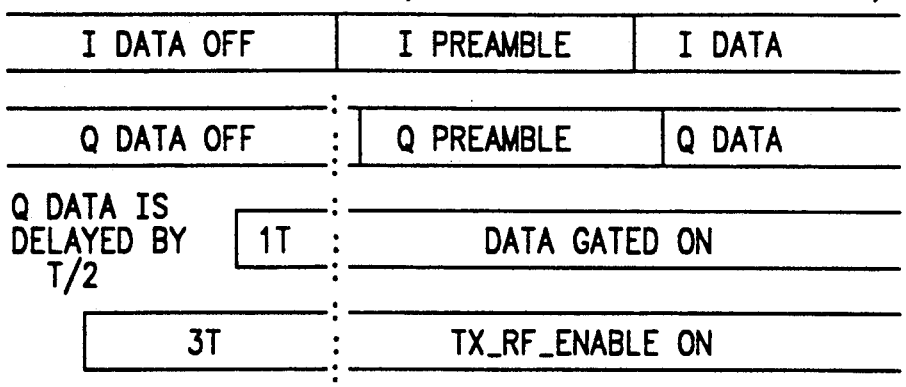
FIG. 4A is a timing diagram for the beginning of a modem transmitted packet.
Figure 4B:
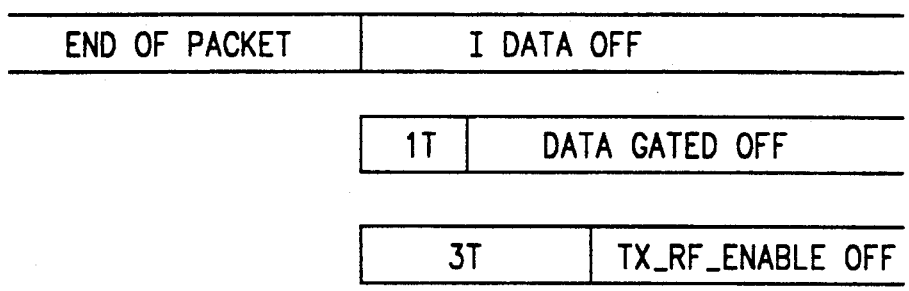
FIG. 4B is a timing diagram for the end of packet.
Figure 4C:
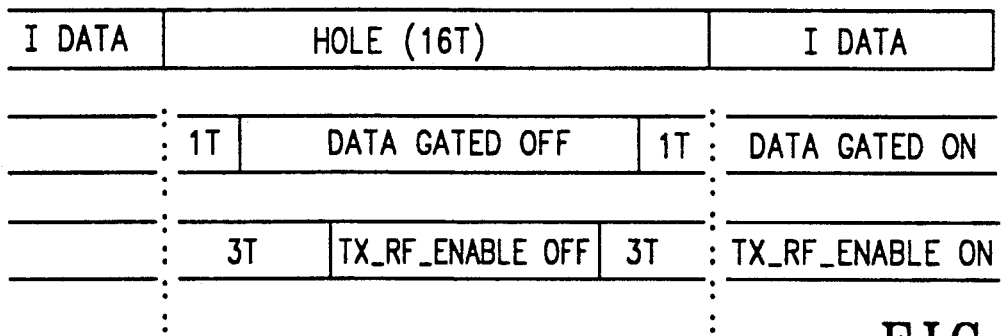
FIG. 4C is a timing diagram for a collision hole.

FIGS. 4A-C are timing diagrams for the modem showing the relationship between the I and Q data, and the data gate and TX_RF_Enable signals used to shape the turn on and turn off of the packet RF energy to prevent spectrum spreading. FIG. 4A shows the beginning of a packet, FIG. 4B shows the end of a packet, and FIG. 4C shows the collision hole generation.

Figure 5A:
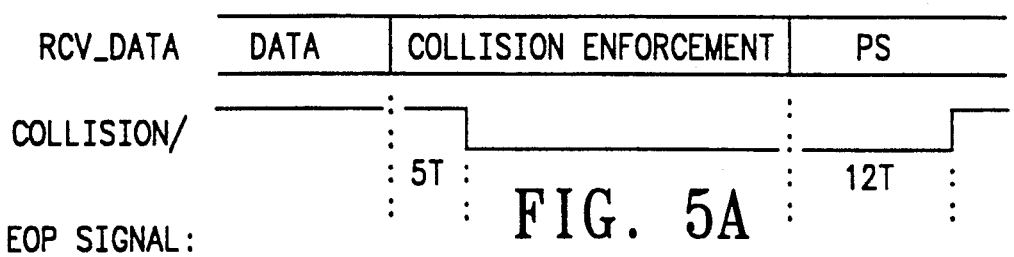
FIG. 5A is a timing diagram for a modem generated collision signal.
Figure 5B:
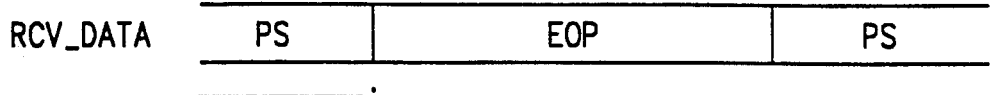
FIG. 5B is a timing diagram for end of packet.

FIGS. 5A and 5B show the detection circuit timing in the modem for received collision enforcement and end-of-packet signals.

Figure 6A:
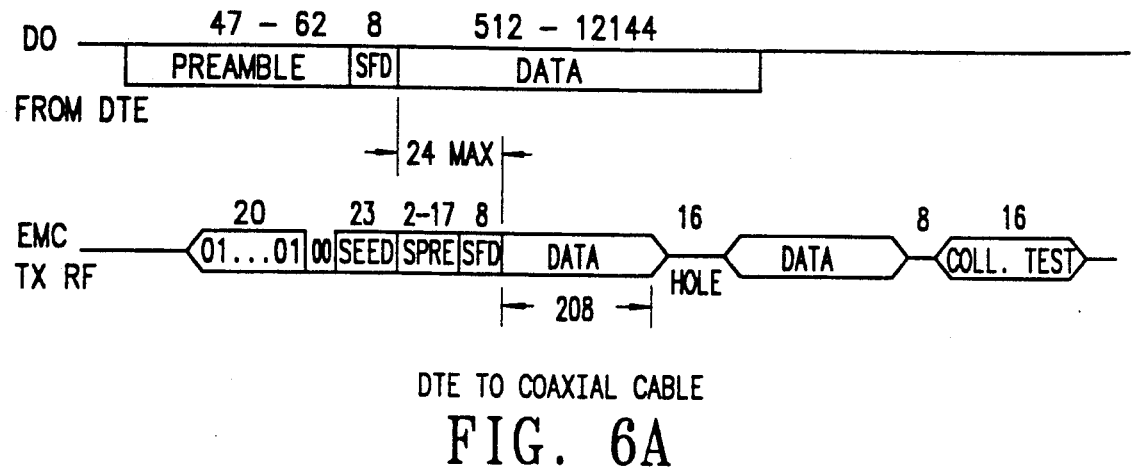
FIGS. 6A and 6B are timing diagrams of upstream and downstream data packets.

FIG. 6A is a timing diagram showing the data out (DO) signal from the computer (DTE) and the resulting transmitted RF packet from the modem.

Figure 6B:
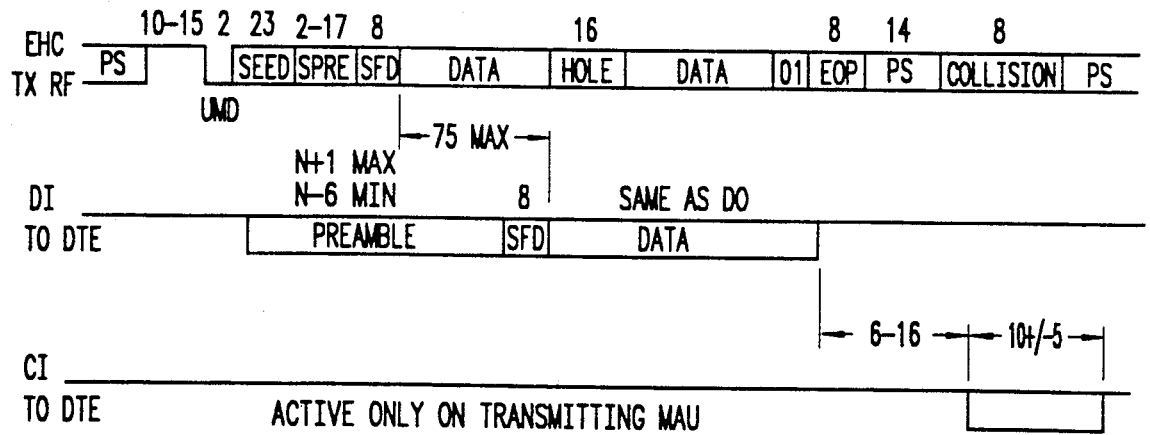

FIG. 6B is a timing diagram showing the received RF signal at the modem and the resulting data (DI) and collision (CI) sent to the DTE. The following note applies to FIGS. 6A, 6B:
TIMES IN BITS
PREAMBLE = 10101010
SED = 10101011
EOP = 01010101 WITH −90 DEG PHASE SHIFT
PS = PSEUDOSILENCE = 10101010
HOLE (EMC RF) = DATA STOPPED, CARRIER DROPPED
HOLE (EHC RF) = UNKNOWN DATA
COLL. TEST = RANDOM DATA
COLLISION = 01010101 WITH +90 DEG PHASE SHIFT FIG. 7A is a timing diagram for the headend generated end-of-packet. The diagram shows the digital TX_DATA and −90 deg. control signal generating an eight bit long −90 deg. phase shift in the data. The −90 deg. control signal is delayed 4 bits to allow for delay in the data filter.

FIG. 7B is a timing diagram for the headend generated collision enforcement. The diagram shows the 5 digital TX_DATA, +90 deg., and −90 deg. signals generating the + and −90 deg. phase shift in the data. The control signals are not delayed in this case since collision enforcement must be sent immediately and the data is no longer valid.

FIG. 7C is a timing diagram for the headend showing the sampling of the hole and collision test in the received signal by the collision window signal and the resulting collision signal. If there is no signal during the hole the collision signal will not be active. The collision test signal occurs at the end of every good packet and is used to test the collision enforcement circuits. The collision signal should be active during the collision test.

Figure 7D:
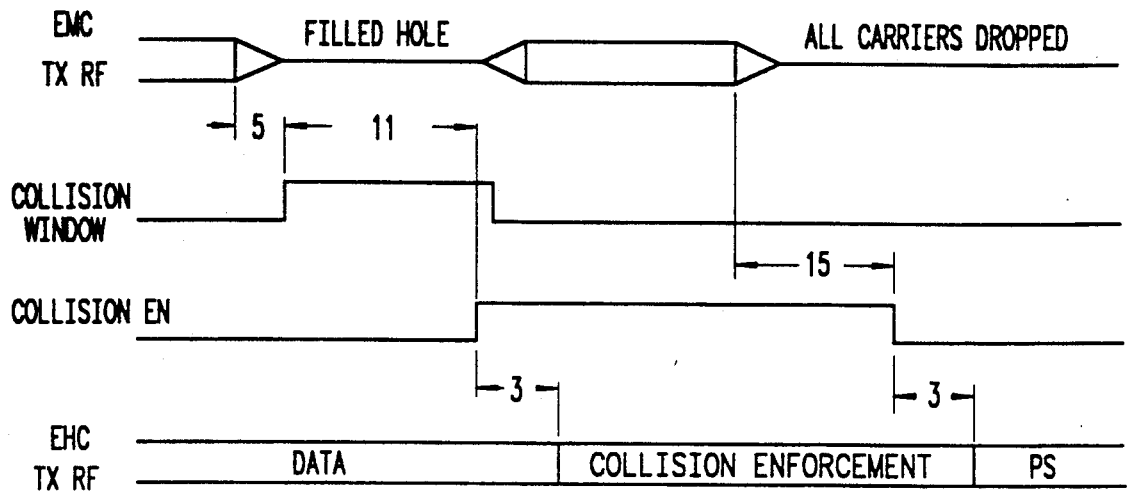
FIG. 7D is a timing diagram for collision enforcement.

FIG. 7D is a timing diagram showing the collision enforcement at the headend. With the hole in the received signal filled with a colliding signal, the collision is detected and the collision enforcement signal is sent downstream.

Figure 7E:
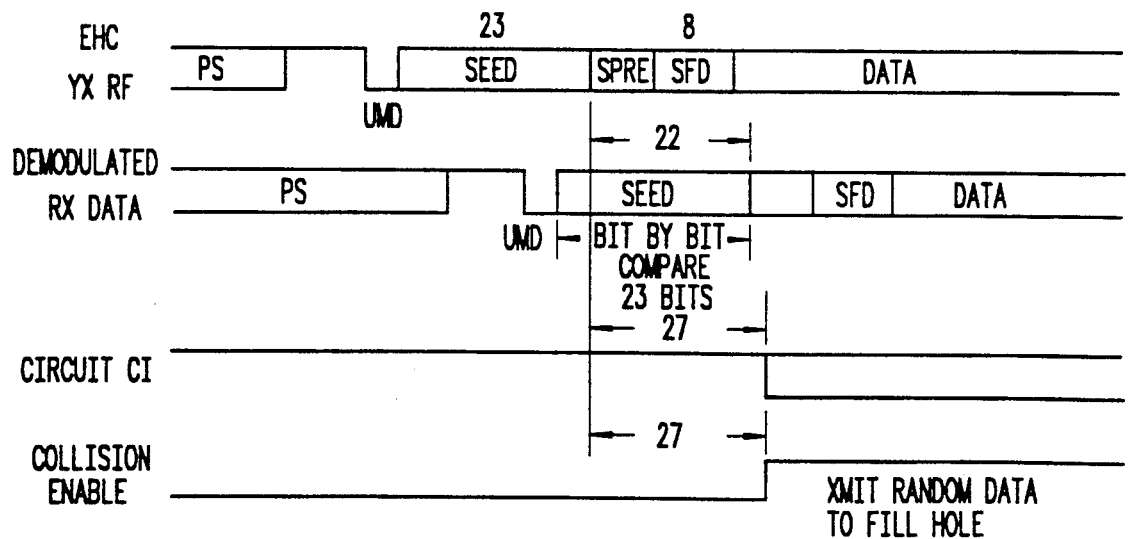
FIG. 7E is a timing diagram for collision enable signal.

FIG. 7E is a timing diagram of the modem showing a collision generated by the bit by bit comparison of the seed. When the seed in the demodulated data does not compare with the transmitted seed that has been stored, the collision signal is sent to the DTE on the CI circuit and the modem transmits random data to fill the hole.

There has been described a communication system in which baseband signals from a plurality of data terminal equipment units are connected to a broadband transmission media through modems and in which the DTE equipment can communicate with one another by transmitting data upstream to a headend unit which retransmits the data to an addressed unit. The data packets can be transmitted through channels having reduced bandwidth by combining collision detection in the transmitted data packet.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A communication system comprising a broadband transmission medium, a plurality of node devices coupled to said broadband transmission medium, each node device including
   means for accepting a first packet of digital data from a data terminal equipment,
   means for inserting a gap in said first packet of digital data,
   means for modulating a first radio frequency carrier with said first packet of digital data,
   means for coupling said first radio frequency carrier onto said broadband transmission medium,
   means for coupling a second radio frequency carrier from said broadband transmission medium,
   said second radio frequency carrier being modulated by a second packet of digital data,
   means for demodulating said second radio frequency carrier and recovering said second packet of digital data,
   means for transferring said second packet of digital data to said data terminal equipment, and
   a headend device coupled to said broadband transmission medium, said headend device including
   means for demodulating said first radio frequency carrier and recovering said first packet of digital data and locating said gap,
   means for detecting a signal level present on said first radio frequency carrier during said gap, said signal level being indicative of simultaneously transmitted signals, and means for modulating said second radio frequency carrier with said first packet of digital data and a signal indicating an alarm when said signal level indicates simultaneously transmitted signals, said means for modulating said second radio frequency carrier transmitting a continuous bit pattern to said node devices in the absence of a received first packet of digital data.

2. The communication system as defined by claim 1 wherein said broadband transmission medium comprises a transmission line for transporting said first radio frequency carrier in one of a first plurality of frequency channels to said headend unit and transporting said second radio frequency carrier to said node devices in one of a second plurality of frequency channels.

3. The communication system as defined by claim 2 wherein said transmission line comprises a coaxial cable.

4. The communication system as defined by claim 2 wherein said transmission line comprises an optical fiber.

5. The communication system as defined by claim 1 wherein said broadband transmission medium comprises a first loop for upstream transmission of said first radio frequency carrier from said node devices to said headend unit and a second loop for downstream transmission of said second radio frequency carrier from said headend unit to said node devices.

6. The communication system as defined by claim 1 wherein said means for modulating said second radio frequency carrier transmits said continuous bit pattern with phase shift as said alarm when said signal level indicates simultaneously transmitted signals.

7. The communication system as defined by 1 wherein said headend device further includes a reference clock and means for aligning in time bits in said first packet of digital data and said reference clock.

8. The communication system as defined by claim 1 wherein each of said node devices includes means for multiplying said first packet of digital data by a pseudorandom data sequence seed prior to modulating said first radio frequency carrier and including said seed with said first packet of digital data, said node means including means for comparing said seed as retransmitted by said headend device with said transmitted pseudorandom data sequence seed and for indicating an alarm when a bit error is detected.

9. The communication system as defined by claim 8 wherein said alarm comprises modulating said first radio frequency carrier with a pseudorandom data sequence without a gap.

10. The communication system as defined by claim 8 wherein each of said node devices includes means for timing a transmitted packet of digital data and indicating an alarm when the received packet of digital data exceeds a predetermined time period.

11. The communication system as defined by claim 1 wherein each of said node devices includes means for timing a transmitted packet of digital data and indicating an alarm when the received packet of digital data exceeds a predetermined time period.

12. The communication system as defined by claim 1 wherein at least one of said data terminal equipment comprises a computer.

13. The communication system as defined by claim 1 wherein said means for modulating a first radio frequency signal employs quadrature phase shift keying, and said means for modulating said second radio frequency signal employs amplitude modulated phase shift keying.

14. A communication system comprising a plurality of node devices, each one of said node devices having means for
   accepting a packet of digital data from a controlling unit, modulating the data onto a radio frequency carrier, and inserting a hole in the transmission at a predetermined location relative to the start of the packet whereby no data from the packet is lost by inserting the hole, recovering a digital bit stream from a continuous radio frequency signal, identifying the beginning a data packet, locating and removing the hole from the packet and transmitting the reconstructed packet to the controlling unit, and detecting the presence of a collision alarm in the received signal, indicated by a specific pattern of phase shift in the recovered bit stream,
   a first broadband communication medium coupled to said node device,
   a second broadband communications medium coupled to said node device, and
   a headend device having demodulator means coupled to said first broadband communications medium for receiving signals upstream from said node devices, and having modulator means coupled to said second broadband communications medium for transmitting continuous signals downstream to said node devices, the demodulator means comprising means for recovering the transmitting data packet, identifying the beginning of the packet, locating the transmitted hole, and detecting the signal level present on the said first medium during the transmission of the hole, a signal level which exceeds a minimum threshold being interpreted as a collision of a plurality of transmitted signals, said modulator means comprising means for transmitting a continuous bit pattern as downstream in the absence of a received signal, remodulating and transmitting the received data packet when an upstream signal is present, and transmitting an alarm signal when a collision is detected, the alarm signal being pseudosilence with a specific pattern of phase shift imposed on the transmitted bit stream.

15. The communication system of claim 14 wherein said first broadband communication medium and said second broadband communication medium are separate frequency channels on a single physical medium.

16. The communication system of claim 14 wherein said headend device comprises means for aligning in time said receive bit pattern of said information to the correct phase of a clock signal of the same frequency in order to allow extracting of bits at an optimized time.

17. The communications system of claim 14 wherein said node devices further comprise scrambling means for multiplying the data packet or a portion of the data packet from the controlling unit by a pseudorandom data sequence, exclusive of the added hole, before transmitting the packet upstream, and means for removing the scrambling from the downstream packet before passing the reconstructed packet to the control unit.

18. The communications system of claim 14 wherein each said node device comprises means for checking, while it is transmitting upstream, some or all of the corresponding downstream packets for errors, and, when an error is detected, replace the transmitting packet with a pseudorandom data sequence with no holes.

19. A method of communicating a baseband signal over a broadband transmission medium comprising the steps of
   establishing a packet of baseband digital data to be transmitted, said packet including a signal with a phase shifted bit stream indicating a collision of transmitted packets,
   inserting a gap in said packet of digital data, modulating a first radio frequency carrier with said packet of digital data to provide a modulated first radio frequency carrier,
   transmitting said modulated first radio frequency carrier over the broadband transmission medium,
   receiving and demodulating said modulated first radio frequency carrier to obtain said packet of digital data, monitoring said gap in said packet of digital data for the presence of digital data thereby determining if a plurality of packets of data have been transmitted simultaneously and a collision of data packets has occurred,
   modulating a second radio frequency carrier with said packet of digital data to obtain a modulated second radio frequency carrier, and
   transmitting said modulated second radio frequency carrier over the broadband transmission medium.

20. The method as defined by claim 19 and further including the step of scrambling said packet of baseband digital data with a seed of digital bits, including said seed in said packet as transmitted in said modulated first radio frequency carrier and in said modulated second radio frequency carrier, and comparing said seed as transmitted in said first modulated radio frequency carrier and as transmitted in said second modulated radio frequency carrier as an indication of a collision of simultaneously transmitted packets of digital data.

21. The method as defined by claim 20 wherein said method of communicating is in a carrier sense multiple access with collision detection (CSMA/CD) network.

* * * * *